United States Patent
Mealey et al.

(10) Patent No.: US 9,904,580 B2
(45) Date of Patent: *Feb. 27, 2018

(54) EFFICIENT CRITICAL THREAD SCHEDULING FOR NON-PRIVILEGED THREAD REQUESTS

(71) Applicant: INTERNATIONAL BUSINESS MACHINES CORPORATION, Armonk, NY (US)

(72) Inventors: Bruce Mealey, Austin, TX (US); Suresh E. Warrier, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/726,439

(22) Filed: May 29, 2015

(65) Prior Publication Data

US 2016/0350158 A1   Dec. 1, 2016

(51) Int. Cl.
*G06F 9/46* (2006.01)
*G06F 9/50* (2006.01)

(52) U.S. Cl.
CPC .... *G06F 9/5038* (2013.01); *G06F 2209/5018* (2013.01)

(58) Field of Classification Search
CPC ................. G06F 2209/5018; G06F 9/5038
USPC ........................................................ 718/103
See application file for complete search history.

(56) References Cited

U.S. PATENT DOCUMENTS

| 6,091,709 | A  | * | 7/2000 | Harrison | H04L 47/724 370/235 |
| 7,076,637 | B2 | * | 7/2006 | Kelley | G06F 9/468 712/229 |
| 7,120,794 | B2 |   | 10/2006 | Kelley et al. | |
| 7,340,742 | B2 | * | 3/2008 | Tabuchi | G06F 9/4843 709/203 |
| 8,689,222 | B2 |   | 4/2014 | Anand et al. | |
| 8,862,738 | B2 | * | 10/2014 | Madduri | G06F 9/5011 709/226 |

(Continued)

OTHER PUBLICATIONS

U.S. Appl. No. 14/827,109, filed Aug. 14, 2015, In re Mealey, 40 pages.

(Continued)

*Primary Examiner* — Benjamin Wu
*Assistant Examiner* — Willy W Huaracha
(74) *Attorney, Agent, or Firm* — Joseph Petrokaitis; Amy J. Pattillo

(57) ABSTRACT

An operating system interface, responsive to detecting a non-privileged thread request with a scheduling attribute set to a critical setting to request access to at least one privileged core, selectively schedules the non-privileged thread request into a privileged core queue associated with the at least one privileged core only when a resource availability of the at least one privileged class core meets a threshold level of availability, the at least one privileged core providing a higher throughput than at least one regular core. The operating system interface, responsive to detecting a privileged thread request with the scheduling attribute set to the critical setting, automatically scheduling the privileged thread request into the privileged core queue.

14 Claims, 8 Drawing Sheets

(56) References Cited

U.S. PATENT DOCUMENTS

| | | | |
|---|---|---|---|
| 2006/0133418 A1* | 6/2006 | Anand | H04L 12/5695 370/468 |
| 2008/0127192 A1* | 5/2008 | Capps | G06F 1/3203 718/103 |
| 2008/0229318 A1* | 9/2008 | Franke | G06F 9/5038 718/104 |
| 2009/0327610 A1* | 12/2009 | David | G06F 9/3851 711/119 |
| 2012/0198461 A1* | 8/2012 | Saxe | G06F 9/5027 718/103 |
| 2013/0152098 A1 | 6/2013 | Francois et al. | |
| 2014/0082625 A1 | 3/2014 | Busaba et al. | |

OTHER PUBLICATIONS

Muir, et al, "Proper: Privileged Operations in a Virtualised System Environment", PlanetLab, Aug. 2004, updated Jun. 2005, published in the Proceedings of the USENIX 2005 Annual Technical Conference, Anaheim, California, Apr. 2005, PDN-04-022, 16 pages.

Li et al, "Efficient Operating System Scheduling for Performance-Asymmetric Multi-Core Architectures", accessed via the Internet at <http://happyli.org/Tong/papers/amps.pdf> as of at least May 27, 2015, 11 pages.

Office Action, dated Mar. 10, 2017, U.S. Appl. No. 14/827,109, filed Aug. 14, 2015, In re Mealey, 35 pages.

Notice of Allowance, dated Oct. 6, 2017, U.S. Appl. No. 14/827,109, filed Aug. 14, 2015, In re Mealey, 80 pages.

* cited by examiner

US 9,904,580 B2

EFFICIENT CRITICAL THREAD SCHEDULING FOR NON-PRIVILEGED THREAD REQUESTS

1. TECHNICAL FIELD

The embodiment of the invention relates generally to processor scheduling and particularly to efficient critical thread scheduling for non-privileged thread requests.

2. DESCRIPTION OF THE RELATED ART

An application may include different types of threads, with different threads requiring different scheduling behaviors. In one example, a selection of threads within an application may be critical threads that need to be scheduled preferentially over other threads of the application.

BRIEF SUMMARY

In addition to each application having threads requiring different scheduling behaviors, different application threads may be assigned different privilege levels, where each privilege level specifies the application thread's access to privileged resources. Therefore, in view of the foregoing, there is a need for a method, system, and computer program product for efficient critical thread scheduling for non-privileged application threads.

In another embodiment, a system for scheduling threads, comprising a processor, coupled with a memory. The processor configured to perform the actions of, responsive to detecting, by an operating system interface, a non-privileged thread request with a scheduling attribute set to a critical setting to request access to at least one privileged core of a plurality of cores, selectively scheduling the non-privileged thread request into a privileged core queue associated with the at least one privileged core only when a resource availability of the at least one privileged core meets a threshold level of availability, the at least one privileged core providing a higher throughput than at least one regular core of the plurality of cores. The processor configured to perform the actions of, responsive to detecting, by the operating system interface, a privileged thread request with the scheduling attribute set to the critical setting, automatically scheduling the privileged thread request into the privileged core queue.

In another embodiment, a computer program product for scheduling threads. The computer program product comprises a computer readable storage medium having program instructions embodied therewith. The program instructions are executable by a processor to cause the processor to, responsive to detecting, by an operating system interface, a non-privileged thread request with a scheduling attribute set to a critical setting to request access to at least one privileged core of a plurality of cores, selectively schedule the non-privileged thread request into a privileged core queue associated with the at least one privileged core only when a resource availability of the at least one privileged core meets a threshold level of availability, the at least one privileged core providing a higher throughput than at least one regular core of the plurality of cores. The program instructions are executable by a processor to cause the processor to, responsive to detecting, by the operating system interface, a privileged thread request with the scheduling attribute set to the critical setting, automatically schedule the privileged thread request into the privileged core queue.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
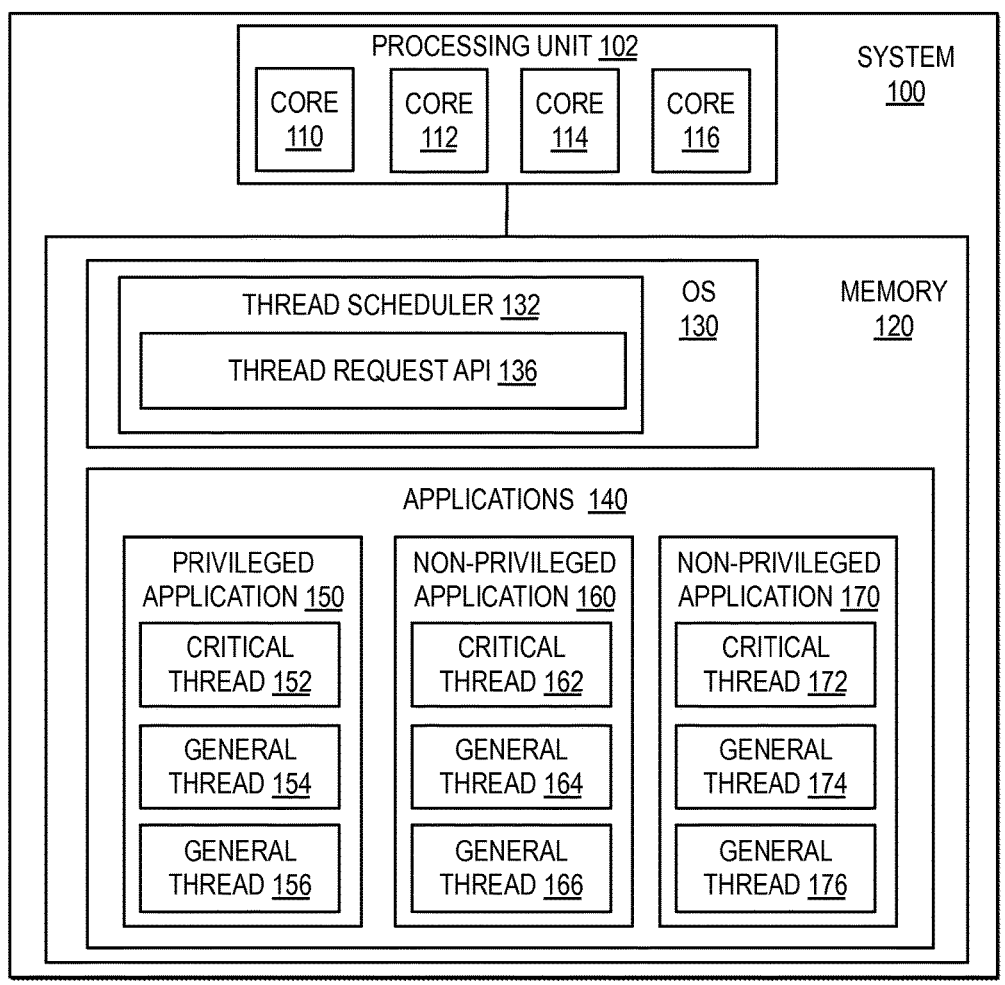
FIG. 1 illustrates one example of block diagram of a system for managing efficient critical thread scheduling for non-privileged thread requests.

FIG. 1 illustrates a block diagram of one example of a system for managing efficient critical thread scheduling for non-privileged thread requests.

In one example, a system 100 may be implemented on one or more data processing systems or one or more platforms. In one example, as illustrated in FIG. 1, system 100 comprises one or more processing units, such as processing unit 102, coupled to a memory 120. In one example, memory 120 includes one or more operating systems, such as OS 130, and one or more applications, such as applications 140.

In one example, processing unit 102 may comprise a multi-processor unit having multiple processors, where each processor is implemented within one or more cores. In one example, processing unit 102 comprises a core 110, a core 112, a core 114, and a core 116. In another example, system 100 may include additional or alternate processor units and each processor unit may include additional or alternate numbers of cores. In another example, one or more cores of processing unit 102 may represent a virtualized core. In one example, system 100 may also include a hypervisor layer for virtualizing each of core 110, core 112, core 114, and core 116 into one or more virtual machines or other virtualization layers, where each virtualization layer may include a selection from among the cores and an instance of OS 130.

In one example, processing unit 102 may enable the execution of multiple processes within applications 140. Each process of each application from among applications 140 may run one or more threads. In one example, a thread may refer to a single flow of control within a process of an application. In addition, each process may include multiple threads and the threads of a same process may share resources selected for the process. For example, shared resources by threads of a same process may include, but are not limited to, a shared library, memory, and a virtual address space.

OS 130 may include a thread scheduler 132 for controlling access to processing unit 102 by scheduling threads for execution within processing unit 102 and otherwise making resources available to threads. In one example, thread scheduler 132 may be implemented by or in coordination with a kernel. In another example, thread scheduler 132 may be implemented within additional or alternate hardware or software layers within system 100. In addition, in additional or alternate examples, system 100 may include additional or alternate hardware and software layers.

In one example, each of the applications in applications 140 may be dynamically classified as a privileged application, such as privileged application 150, or as a non-privileged application, such as non-privileged application 160 and non-privileged application. In one example, privileged application 150 may refer to an application currently set as a root user and may represent an application currently set to an account that has root privileges. In one example, an application that has root privileges is the most privileged on the system and has complete access to all the files and commands of OS 130. In one example, root privileges may allow the root application to modify system 100, including making changes or additions to OS 130, without restriction and to grant and revoke access permission for other applications within applications 140. In one example, processes started by an application currently set as a privileged application, with root privileges, also have root privileges, and each thread request of the processes of a privileged application may be referred to as a privileged thread request. In contrast, an application classified as a non-privileged application runs with very limited privileges, with limited or no access to the files and commands of OS 130, with restricted access to modify the system or grant or revoke access permission for other applications, and each thread request of the processes of a non-privileged application may be referred to as a non-privileged thread request.

In one example, each application within applications 140 may run threads that require preferential treatment, such as through latency or throughput optimizations, for one or more reasons. In one example, threads that require preferential treatment may be referred to as critical threads, such as a critical thread 152 of privileged application 150, a critical thread 162 of non-privileged application 160, and critical thread 172 of non-privileged application 170. In contrast, other threads that do not require preferential treatment may be referred to as general threads, such as general thread 154 and general thread 156 of privileged application 150, general thread 164 and general thread 166 of non-privileged application 160, and general thread 174 and general thread 176 of non-privileged application 170.

In one example, critical threads may refer to certain threads that request access to a portion of memory 120 or other resources that are shared by other processes or other threads and the certain threads may need to acquire a lock to prevent another thread from accessing or using the same resource at the same time or may need to execute prior to another thread executing. A thread that requires a lock or needs to execute prior to another thread executing may need preferential treatment in the order of processing. For example, a compilation thread may require preferential treatment, as a critical thread that needs to be dispatched as soon as it is woken up, with minimal latency, so the compilation thread may complete a compilation, blocking other threads that need to execute the code segment being compiled until the compilation is complete. In another example, a thread that performs garbage collection may require preferential treatment, as a critical thread, to acquire a lock on the portion of memory on which garbage collection is performed, to prevent other threads from preempting garbage collection completion. In one example, a JAVA application may include a process that calls a compilation thread, which requires preferential treatment, and may include a process that calls a garbage collection thread, which requires preferential treatment.

In one example, when there are critical threads waiting after being scheduled to run, wait times for critical threads increase the thread latencies and decrease the throughput for processes, as general threads wait for critical threads to finish execution and release locks on resources. In one example, to decrease the thread latencies and increase throughput of a process, thread scheduler 132 may be optimized to handle critical threads differently from general threads.

In one example, each thread may include a scheduling attribute set to critical or general, along with the privilege setting indicating whether a thread is privileged or non-privileged. In one example, according to the invention, each of privileged application 150, non-privileged application 160, and non-privileged application 170, may set a scheduling attribute for a thread request to a critical setting, for selecting preferential treatment of the thread, or to a general setting, which may include one or more levels. In particular, in one example, each of privileged application 150, non-privileged application 160, and non-privileged application 170, may send thread requests to OS 130 with a scheduling attribute for the thread request set to a critical setting or to a general setting. In one example, OS 130 may implement a thread request application programming interface (API) 136, for receiving and handling thread requests based on scheduling attribute and privilege setting.

In one example, thread scheduler 132 of OS 130 uses the privilege setting and scheduling attribute assigned to a thread to determine whether and how to schedule threads on a privileged pool of cores that run faster than the cores in a regular pool of cores. In one example, a thread with a scheduling attribute set to critical may indicate a request for access to the privileged pool of cores, while a scheduling attribute set to general or other level, may indicate a request for access to the regular pool of cores.

In one example, when OS 130 receives a privileged thread request, such as a thread request from privileged application 150, because privileged application 150 has root privileges, OS 130 may automatically provide access to the resources requested by the privileged thread request in the scheduling attribute setting, through scheduling by thread scheduler 132. For example, if a privileged thread request includes a scheduling attribute set to a critical setting, thread scheduler 132 may automatically schedule the privileged thread request to the privileged pool of cores.

In contrast, non-privileged thread requests have limited privileges. When OS 130 receives a non-privileged thread request with a scheduling attribute set to critical, such as a thread request from non-privileged application 160 or non-privileged application 170, because the non-privileged applications have limited privileges, the scheduling attribute setting of critical is advisory and thread scheduler 132 only selectively determines whether to provide the non-privileged thread request access to the privileged pool of cores. In one example, only privileged threads are allowed to automatically receive access to a privileged pool of cores when a scheduling attribute is set to critical because if non-privileged applications were allowed to automatically receive access to the privileged pool of cores based on a scheduling attribute set to critical, a programmer could set a non-privileged application to request scheduling of all threads with a scheduling attribute set to critical, to try to give the application's threads priority over other application threads, or a malicious user could exploit a weakness in a non-privileged application to set the scheduling attribute to critical for all threads for the non-privileged application in order to stall a system from handling any other applications. Non-privileged applications, however, still need to be able to request preferential treatment of critical threads when requesting thread scheduling.

In one example, to allow non-privileged application 160 or non-privileged application 170 to request preferential treatment of critical thread 162 or critical thread 172 when requesting thread scheduling, non-privileged application 160 or non-privileged application 170 may temporarily be reclassified as privileged applications, with root privileges, and the threads output while temporarily reclassified would be set to a privileged setting. One limitation of changing a classification of a non-privileged application to a privileged application to allow the application to request preferential treatment of a critical thread, is that even the most well tested applications may contain programming errors that a malicious user can find and exploit to obtain control of a system when the application is run with root privileges, which the malicious user would not be able to do when the application is run as a non-privileged application, with very limited privileges. In addition, another limitation of changing a classification of a non-privileged application to a privileged application to allow the application to request preferential treatment of a critical thread, is that the thread will then run at the privileged level the entire run time, even though the thread may only need to operate at the privileged level for a section of the total run time, such as when the thread copies packets from the network or when the thread holds a critical lock, which may increase the overall latency for thread scheduling and decrease throughput. In addition, while a system may allow for any application to be set to run as a root application, running an application as a privileged, root application does not automatically yield lower latency for thread scheduling or better throughput. Further, another limitation of changing a classification of a non-privileged application to a privileged application to allow an application to request preferential treatment of a critical thread, is that if multiple applications are granted root privileges and request scheduling of multiple critical threads, thread scheduler 132 then has to run an additional decision process to schedule multiple threads received from threads with a privileged setting, which may negatively impact latency and throughput.

In one example, to allow non-privileged application 160 or non-privileged application 170 to request preferential treatment of critical thread 162 or critical thread 172 when requesting thread scheduling, non-privileged application 160 or non-privileged application 170 may be allowed, within the limited permissions granted to non-privileged applications, to lower the scheduling attribute setting of a thread to a lowest priority level, without creating security issues. In one example, non-privileged application 160 or non-privileged application 170 may call thread request API 136, for requesting scheduling of critical thread 162 or critical thread 172, and specify the scheduling attribute set to the general, default setting. Then, to effectively raise the priority of critical thread 162 and critical thread 172, when non-privileged application 160 or non-privileged application 170 call thread request API 136 for requesting scheduling of general thread 164, general thread 166, general thread 174 and general thread 176, the scheduling attribute is set to a lowest level. The option for non-privileged application to set the scheduling attribute to a lowest level for some threads in order to effectively give preference to critical threads may improve latency if only a single application is running, however, if multiple applications are running, with multiple applications and threads competing for runtime, those regular threads of the non-privileged applications set to a lower priority may be penalized compared to other thread processes and the entire application may run slower.

In one example, according to one embodiment of the invention, to allow non-privileged application 160 or non-privileged application 170 to request preferential treatment of critical thread 162 or critical thread 172 when requesting thread scheduling, without reclassifying a non-privileged application as a privileged application or without scheduling general threads of non-privileged applications with a scheduling attribute set to a lowest level, as illustrated in FIG. 1, thread request API 136 may be modified to provide an interface through which non-privileged applications may request scheduling of threads with a schedule attribute set to critical, as an advisory request for access to a privileged pool of cores. Thread scheduler 132 manages efficient scheduling of threads, from privileged thread requests with a scheduling attribute set to critical, on a selection of the fastest cores specified in a privileged pool of cores. In addition, thread scheduler 132 manages efficient scheduling of threads, from non-privileged applications with a scheduling attribute set to critical, on the privileged pool of cores, if the resource availability for the privileged pool of cores meets a threshold for availability.

Figure 2:
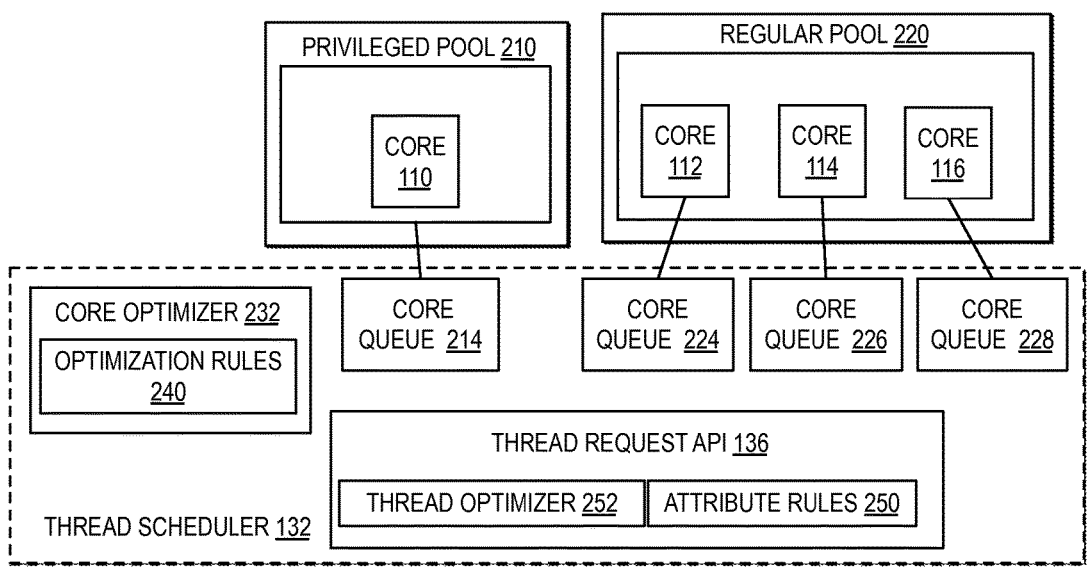
FIG. 2 illustrates one example of a block diagram a thread scheduler for efficiently scheduling non-privileged threads with a scheduling attribute set to critical.

FIG. 2 illustrates a block diagram of one example of a thread scheduler for efficiently scheduling critical threads from a non-privileged thread request.

In one example, thread scheduler 132 may implement a core optimizer 232. Core optimizer 232 may select to dynamically allocate the cores of system 100, at the core level, and further at the CPU level, into two or more pools. In one example, core optimizer 232 may dynamically allocate cores from system 100 into a privileged pool 210 and into a regular pool 220. In one example, core optimizer 232 may monitor the use of the cores of system 100 and dynamically adjust the allocation of cores among privileged pool 210 and regular pool 220 to optimize use of the core resources according to current and expected demands.

In determining the selections of cores to allocate to privileged pool 210, core optimizer 232 may follow one or more optimization rules 240. In one example, optimization rules 240 may include a rule that directs core optimizer 232 to select to allocate faster cores to privileged pool 210 to allow for higher throughput to threads assigned to the cores in privileged pool 210 to optimize the use of faster cores for handling critical threads. In one example, optimization rules 240 may specify a threshold speed for cores to be included in privileged pool 210.

In one example, one core may be considered a faster core based on one or more factors that impact the latency and throughput of the core, including, but not limited to, one or more hardware factors and one or more software factors. For example, one core, with a stronger core strength, defined by a larger cache or higher frequency, may be considered a faster core than another core, with a weaker core strength, defined by a smaller cache or lower frequency. In another example, one core may be considered a faster core because an OS is set in a manner that allows the core to effectively run faster. For example, an OS may manage a simultaneous multithreading (SMT) setting that limits the number of threads on a core or a frequency shifting setting, which makes the core faster. In another example, by limiting the number of thread requests that are allowed to be scheduled on the cores in privileged pool 210, the cores in privileged pool 210 may run faster because there is less contention from other threads.

For example, as illustrated, core optimizer 232 may determine, based on optimization rules 240, to initially allocate core 110 to privileged pool 210 and to initially allocate core 112, core 114, and core 116 to regular pool 220. In one example, core 110 may represent a faster core in comparison to one or more of core 112, core 114, and core 116. In one example, when core optimizer 232 selects to allocate core 110 to privileged pool 210, core optimizer 232 may also set the OS and hardware of core 110 to enable core 110 to run faster for fewer threads. In one example, in additional or alternate embodiments, core optimizer 232 may also select to maintain one or more additional or alternate pools of cores.

In one example, thread scheduler 132 may manage scheduling of each core through a core queue for each core, where thread scheduler 132 selects whether to place a thread request in privileged pool 210 or regular pool 220, and then, within each pool, selects which thread requests to place in each core and may also select a priority level to assign each thread request to within each core. For example, thread scheduler 132 may manage thread scheduling through the management of thread requests in core queue 214 for scheduling on core 110, thread requests in core queue 224 for scheduling on core 112, thread requests in core queue 226 for scheduling on core 114, and thread requests in core queue 228 for scheduling on core 116. In one example, the thread requests waiting in each core queue are handled in order for triggering execution of the thread associated with the thread request on the core associated with the core queue. In another example, thread scheduler 132 may apply additional rules for managing the order in which thread requests waiting in each core are handled.

In one example, optimization rules 240 may include one or more rules specifying a minimum number of cores to initially allocate to privileged pool 210 and one or more additional rules to be applied to dynamically determine, during runtime, whether to adjust the current allocations of cores between privileged pool 210 and regular pool 220. For example, optimization rules 240 may include a rule that directs core optimizer 232 to monitor for idle cores and to automatically add any idle cores in regular pool 220 to privileged pool 210. In another example, optimization rules 240 may include a rule that directs core optimizer 232 to maintain a threshold percentage of idle core capacity in regular pool 220 up to a maximum, based on full capacity, such as specifying that 80% of idle core capacity, to allow OS 130 to handle any sudden spikes as well as maintain cores within privileged pool 210. In another example, optimization rules 240 may include a rule that directs a thread optimizer 252 to determine whether thread requests can be shifted between privileged pool 210 and regular pool 220 to maintain a balance of cores allocated to each pool and to most effectively use the capacity available in each pool, giving priority to quickly handling privileged, critical thread requests in privileged pool 210.

In another example, optimization rules 240 may include one or more rules for directing core optimizer 232 to monitor utilization percentages of the cores within privileged pool 210 and regular pool 220 over a period of time. Optimization rules 240 may specify that if the utilization percentage for one of privileged pool 210 and regular pool 220 is less than a particular threshold, to direct core optimizer 232 to release cores. Optimization rules 240 may specify that if the utilization percentage for one of privileged pool 210 and regular pool 220 in comparison with one another reaches a particular ratio, to direct core optimizer 232 to reallocate cores between privileged pool 210 and regular pool 220 to adjust the ratio.

In one example, thread scheduler 132 may implement an interface, such as thread request API 136, for receiving thread requests from applications for scheduling and determining, for each thread request, based on the scheduled attribute of the thread request compared with attribute rules 250, whether to direct the thread request to privileged pool 210 or regular pool 220. Each application calling thread request API 136 may specify a scheduling attribute for the thread request. In another example, OS 130 may include additional or alternate interfaces for receiving thread requests from applications and determining, for each thread request, whether to direct the thread request to privileged pool 210 or regular pool 220.

In one example, according to attribute rules 250, thread scheduler 132 may select to automatically distribute all privileged thread requests, with a scheduling attribute set to critical, to privileged pool 210, and may automatically distribute privileged thread requests, with a scheduled attribute set to only general or a lower setting, to regular pool 220. In additional or alternate embodiments, thread scheduler 132 may apply additional or alternate rules from attribute rules 250 when distributing privileged thread requests based on scheduling attribute settings.

In addition, according to attribute rules 250, thread scheduler 132 may select to automatically distribute all non-privileged thread requests to regular pool 220, however, thread scheduler may mark any non-privileged thread requests received with a scheduling attribute set to critical for preferential treatment. Thread optimizer 252 may then determine, based on attribute rules 250, whether to dynamically adjust a thread request marked for preferential treatment from queuing in regular pool 220 to queuing in privileged pool 210. Thread optimizer 252 determines, based on attribute rules 250, whether there is sufficient capacity within privileged pool 210 to place non-privileged thread requests, with a scheduling attribute set to critical, in core queue 214 without negatively impacting the rest of the workload in core queue 214. In one example, thread optimizer 252 may determine, based on attribute rules 250, whether there is sufficient capacity by determining from core optimizer 232 whether the cores in privileged pool 210 are running at less than a threshold percentage of the total system capacity. In one example many systems may only run at 40-80% of capacity, in order to have capacity available to handle peaks, so there may regularly be extra capacity available within the cores in privileged pool 210 to handle non-privileged thread requests with a scheduling attribute set to critical. In another example, thread optimizer 252 may determine, based on attribute rules 250, whether there is sufficient capacity by determining whether a threshold number of cores within privileged pool 210 are idle.

In another example, attribute rules 250 may be set such that upon thread request API 136 receiving a non-privileged thread request with a scheduling attribute set to critical, thread optimizer 252 is called to determine whether there is currently capacity in privileged pool 210 to direct the non-privileged thread request, marked as critical, into privileged pool 210, without first scheduling the thread request in regular pool 220. If thread optimizer 252 determines that there is currently capacity in privileged pool 210 to direct the non-privileged thread request, marked as critical, then thread scheduler 132 initially schedules the thread request in privileged pool 210.

In one example, non-privileged thread requests from each of non-privileged application 160 and non-privileged application 170, by calling thread request API 136 with critical thread 162 and critical thread 172 each with a scheduling attribute set to critical, may efficiently prioritize the scheduling of critical threads without needing to lower the scheduling attribute setting or priority of general thread 164, general thread 166, general thread 174, and general thread 176 and without needing to set non-privileged applications to run as privileged applications.

In one example, by core optimizer 232 optimizing a selection of the faster cores in privileged pool 210, thread scheduler 132 controlling the distribution privileged, critical thread requests to queues for cores in privileged pool 210, and thread optimizer 252 selectively determining whether to place non-privileged, critical thread requests on queues for cores in privileged pool 210, for priority use of the faster cores in privileged pool 210, thread scheduler 132 enables more efficient throughput by placing critical threads on the faster cores, facilitating an overall increase in throughput, while also maintaining priority for privileged, critical thread requests over non-privileged, critical thread requests.

In one example, as previously described, non-privileged application 160 and non-privileged application 170 may set a scheduling attribute of a thread request to critical when calling thread request API 136, to trigger preferential treatment for the thread request during scheduling. In another example, thread request API 136 may be specified, according to attribute rules 250, to monitor for threads that call other selected APIs within OS 130 or within other applications and to call thread optimizer 252 to automatically set a scheduling attribute of the thread request to critical. For example, attribute rules 250 could specify a selection of one or more APIs of OS 130 that all garbage collection threads call, where based on attribute rules 250, thread optimizer 252 is triggered to automatically set the scheduling attribute to critical for the garbage collection thread requests to the selection of one or more APIs. In another example, attribute rules 250 could specify an API of OS 130 that is called by a thread operating in a logger role that need to run at the end of a transaction before the transaction can be completed, where based on attribute rules 250, thread optimizer 252 is triggered to automatically set the scheduling attribute to critical for the logger thread request. By setting attribute rules 250 to automatically detect certain types of requests and pass the requests to thread optimizer 252 to set the scheduling attribute of certain types of thread requests to critical, based on the APIs of OS 130 called by the thread requests, a user with the privilege to set attribute rules 250 may select to automate the scheduling attribute setting to critical for selected types of threads from non-privileged applications that need to execute as quickly as possible to decrease latency and improve throughput of other threads. In addition, by setting attribute rules 250 to detect certain types of requests and pass the requests to thread optimizer 252 to set the scheduling attribute of certain types of thread requests to critical, based on the APIs of OS 130 called by the thread requests, a user with the privilege to set attribute rules 250 may select to assign the scheduling attribute to critical for thread requests from non-privileged applications that may not be programmed to call thread request API 136 with a scheduling attribute set to critical. Moreover, a thread within an application may decide to take up the role of a logger, and select to call the APIs of OS 130 as a logger thread, and then unmask itself from the role when the logging is complete. OS 130 could also mask and unmask a thread in the role of logger. By setting attribute rules 250 to automatically set the scheduling attribute to critical for threads that call a logger interface of OS 130, and to reset the scheduling attribute to general when the thread is unmasked, OS 130 may control the selection of a particular thread as requiring preferential treatment only while masked.

While in the embodiment core optimizer 232, thread request API 136, and thread optimizer 252 are illustrates as components of thread scheduler 132, in additional or alternate examples, one or more of the components may function as independent components.

Figure 3:
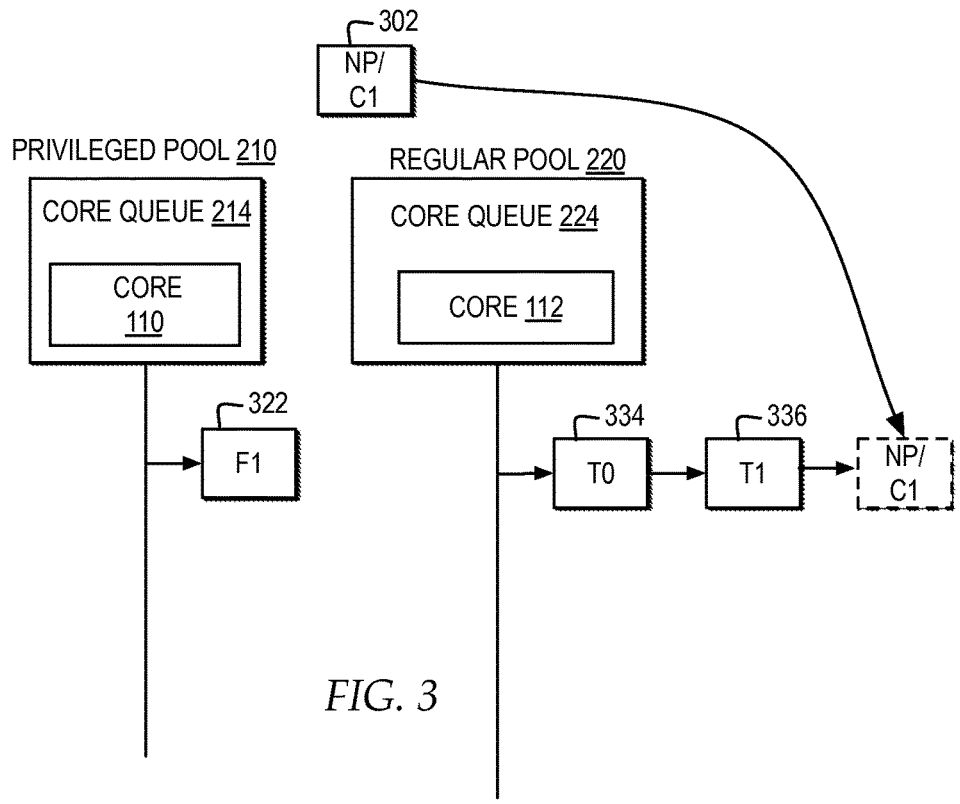
FIG. 3 illustrates one example of a block diagram of a thread request API receiving a non-privileged thread request with a scheduling attribute set critical.

FIG. 3 illustrates a block diagram of one example of a thread request API receiving a non-privileged thread request with a scheduling attribute set to critical.

In one example, core queue 214 is illustrated for core 110 currently allocated to privileged pool 210 and core queue 224 is illustrated for core 112 currently allocated to regular pool 220. In additional or alternate examples, additional or alternate cores and queues may be included in each pool. In addition, each pool may have a queue associated with that pool.

In one example, each core queue may include scheduled entries scheduled for dispatch according to one or more scheduling priority rules. In one example, core queue 214 includes a single scheduled entry 322 for a privileged application entry "F1". In one example, core queue 224 includes multiple scheduled entries illustrated as an entry 334, for a non-privileged application entry "T0", and a next entry 336, for a non-privileged application entry "T1". In additional or alternative embodiments, each queue may include tiers or other specifications for organizing levels of entries within each queue.

In one example, thread request API 136 may receive a non-privileged thread request 302 from a non-privileged application marked as "NP" with a scheduling attribute set to critical, marked as "C1". In one example, thread request API 136 determines scheduling request 302 is from a non-privilege application and with a scheduling attribute set to critical and directs thread scheduler 132 to schedule the thread request within a core queue of regular pool 220, marked as critical. In one example, thread scheduler 132 schedules the thread request with the critical marking "C1".

Figure 4:
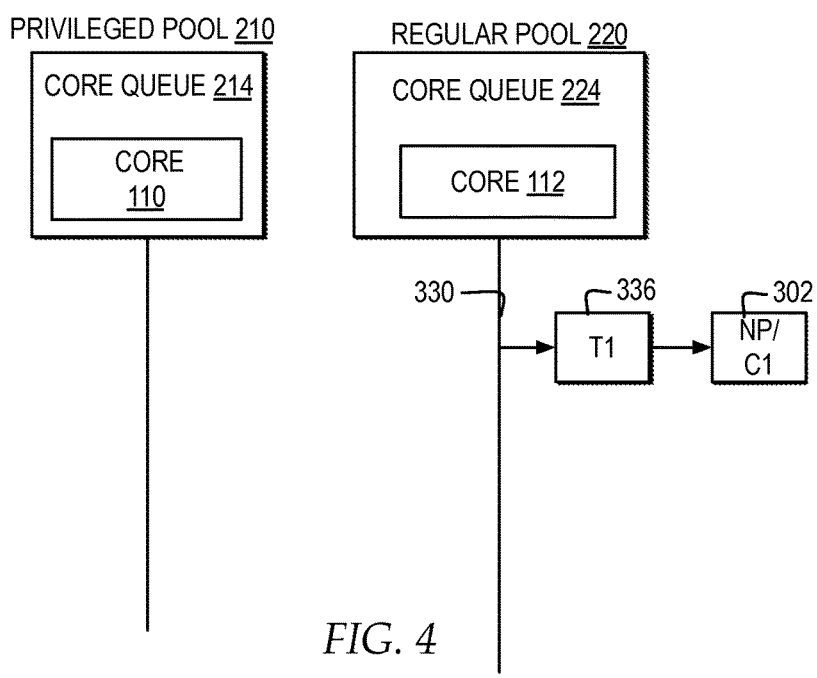
FIG. 4 illustrates one example of a block diagram of a thread scheduler monitoring for idle core queues and calculating a percentage of core queues in each type of pool that are idle.

FIG. 4 illustrates a block diagram of one example of a thread scheduler monitoring for idle core queues and calculating a percentage of core queues of each type of pool that are idle.

In one example, single schedule entry 322 for a privileged application entry "F1" has been released for execution on core 110 and entry 334 for an application entry "T0" has been released for execution on core 112. Once the privileged application entry "F1" executes, core 110 is idle. While in the example core 110 is shown as idle because no other threads are waiting to execute on the core, in other examples, a core may be detected as idle while threads are waiting to be scheduled, but not yet scheduled because of locks or dependencies or while threads are executing, but stalled in a core, because of locks or dependencies.

Core optimizer 232 of thread scheduler 132 may monitor for idle cores, such as core 110, and calculate a percentage of cores of each type of pool that are idle. In one example, where core 110 is the only queue assigned to privileged pool 210 and core 110 is idle, as illustrated at reference numeral 402, core optimizer 232 may calculate that 100% of the cores assigned to privileged pool 210 are idle. In one example, as previously noted in FIG. 2, where core 112, core 114, and core 116 are the cores assigned to regular pool 220 and core 114 and core 116 are idle, as illustrated at reference numeral 404, thread scheduler 132 may calculate that 66% of the cores assigned to regular pool 220 are idle.

In one example, based on rules within optimization rules 240 specifying allocations based on idle core percentages, core optimizer 232 may periodically determine whether to adjust the allocation of cores between privileged pool 210 and regular pool 220 based on the idle percentages calculated by thread scheduler 132, such as the idle percentages illustrated at reference numeral 402 and reference numeral 404. In addition, in one example, based on rules within attribute rules 250 and a determination that core 110 in privileged pool 210 is idle, thread optimizer 250 may determine whether to move a non-privileged thread marked as critical from core queue 224 in regular pool 220 to core queue 214 in privileged pool 210.

Figure 5:
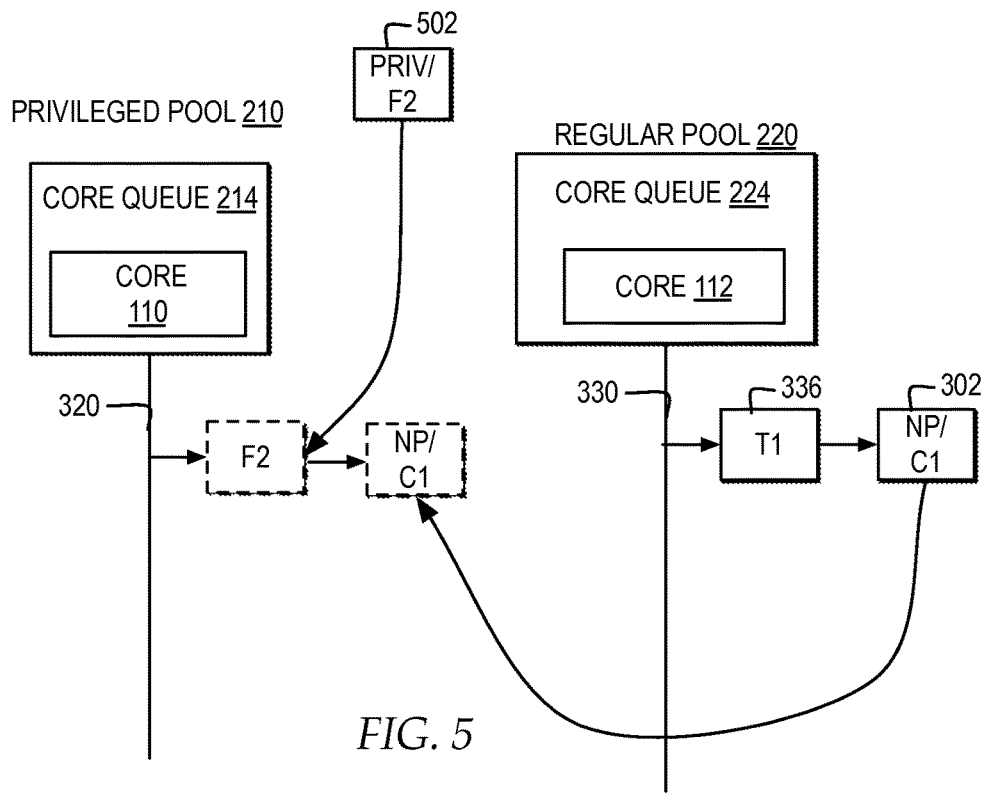
FIG. 5 illustrates one example of a block diagram of a thread scheduler selecting to shift a non-privileged thread marked as critical for preferential treatment from a regular pool to a privileged pool.

FIG. 5 illustrates a block diagram of one example of a thread scheduler selecting to shift a non-privileged thread marked as critical from a regular pool to a privileged pool. In one example, in response to thread optimizer 252 detecting, from core optimizer 232, that core queue 214 is idle, as illustrated in FIG. 4, thread optimizer 252 may identify that there is a non-privileged thread request marked as critical waiting in a core queue for regular pool 220 and decide to move the thread request to idle core queue 214. In one example, thread optimizer 252 determines that thread request 302 is the non-privileged thread request marked as critical waiting in core queue 224 of regular pool 220 when core queue 214 of privileged pool 210 is idle and requests that thread scheduler 132 move thread request 302 from core queue 224 to core queue 214.

In one example, even though core queue 214 was idle when thread scheduler 132 selected to move thread request 302 to core queue 214, thread scheduler 132 may receive a thread request 502 marked "F2" from a privileged (priv) application and automatically schedule thread request 502 in core queue 214. In one example, thread request 502 and thread request 302 may compete for time on cores in privileged pool 210, with a favored priority for running thread request 502 prior to thread request 302 based on traditional scheduling priority rules.

Figure 6:
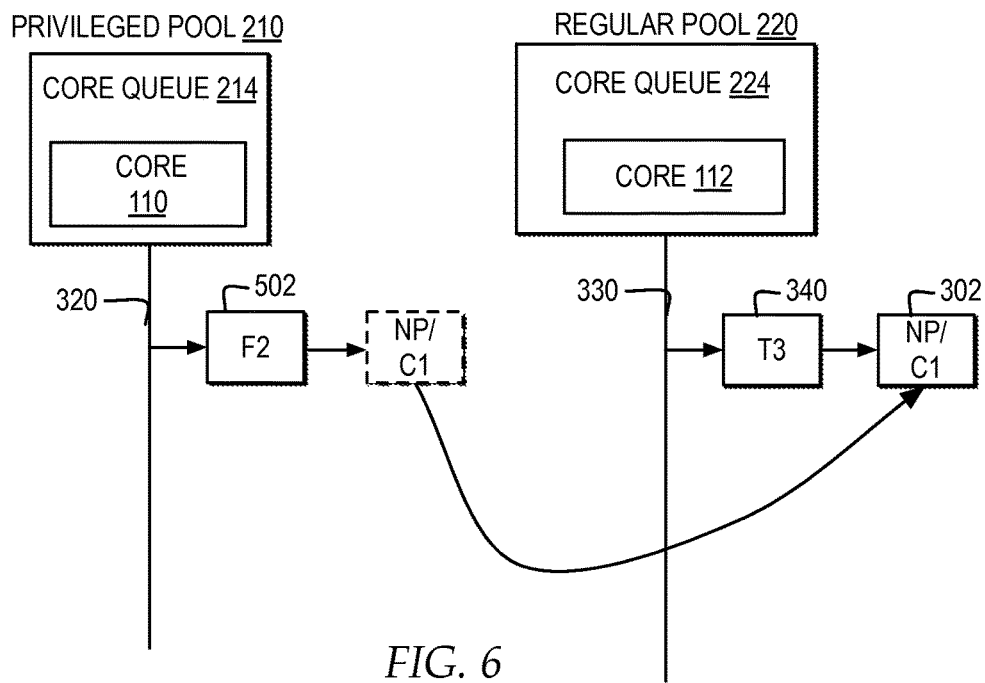
FIG. 6 illustrates one example of a block diagram of a thread scheduler selecting to return a non-privileged thread marked as critical for preferential treatment from a privileged pool to a regular pool.

FIG. 6 illustrates a block diagram of one example of a thread scheduler selecting to return a thread marked for preferential treatment from a privileged pool to a regular pool. In one example, thread optimizer 252 may monitor whether multiple threads in core queue 214 competing for time on the cores in privileged pool 210 and if there are too many threads assigned to privileged pool 210, then thread optimizer 252 may return non-privileged thread requests to regular pool 220, to give priority to privileged threads accessing the faster cores in privileged pool 210 and meet threshold goals for threshold number of threads assigned to privileged pool 210. For example, in response to thread optimizer 252 detecting that thread request 302 is moved to core queue 214 and that an additional thread request 502 is to core queue 214, thread scheduler 132 may determine whether or not to return thread request 302, a non-privileged thread request, back to a core queue of regular pool 220. In one example, attribute rules 250 may specify a rule that allows thread request 302 to remain in core queue 214 because even though, based on traditional scheduling priority rules, thread request 502 may be handled prior to thread request 302, thread request 302 may still be handled faster in privileged pool 210 than if thread request 302 were to remain in core queue 224 because core 110 may be faster than core 112. In another example, attribute rules 250 may specify a rule that requires thread request 302 to be returned to core queue 224, or another core queue within regular pool 220, automatically or after a period of time to reduce the opportunity for thread request 302 to become stuck waiting behind a series of privileged application thread requests.

Figure 7:
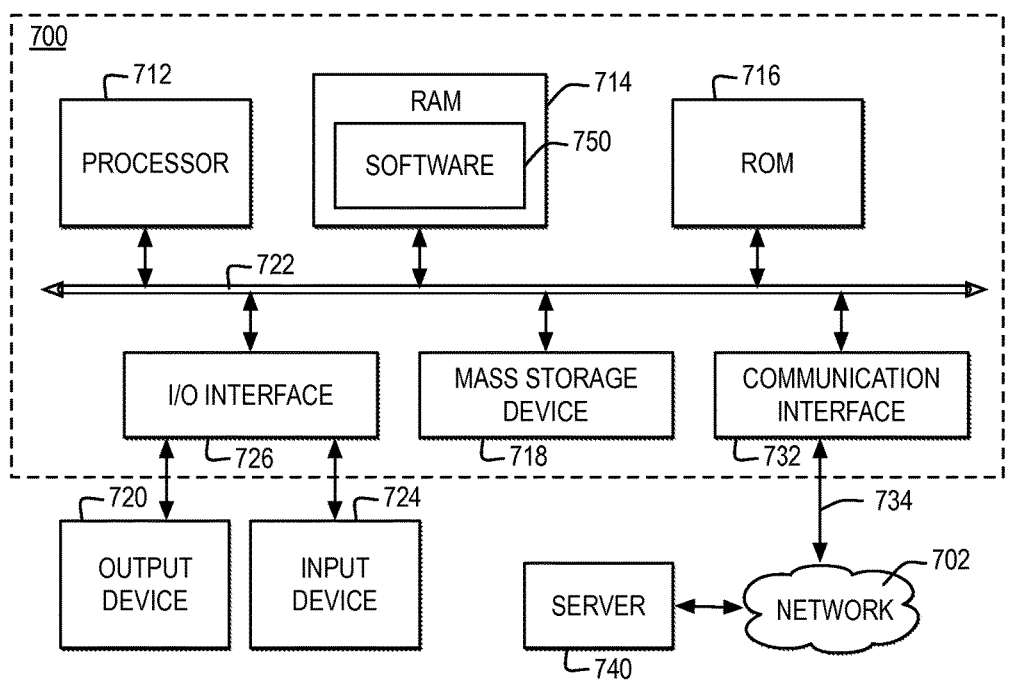
FIG. 7 illustrates one example of a block diagram of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

In one embodiment, the operations performed by processor 712 may control the operations of flowchart of FIGS. 7-10 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts in FIGS. 8-11.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
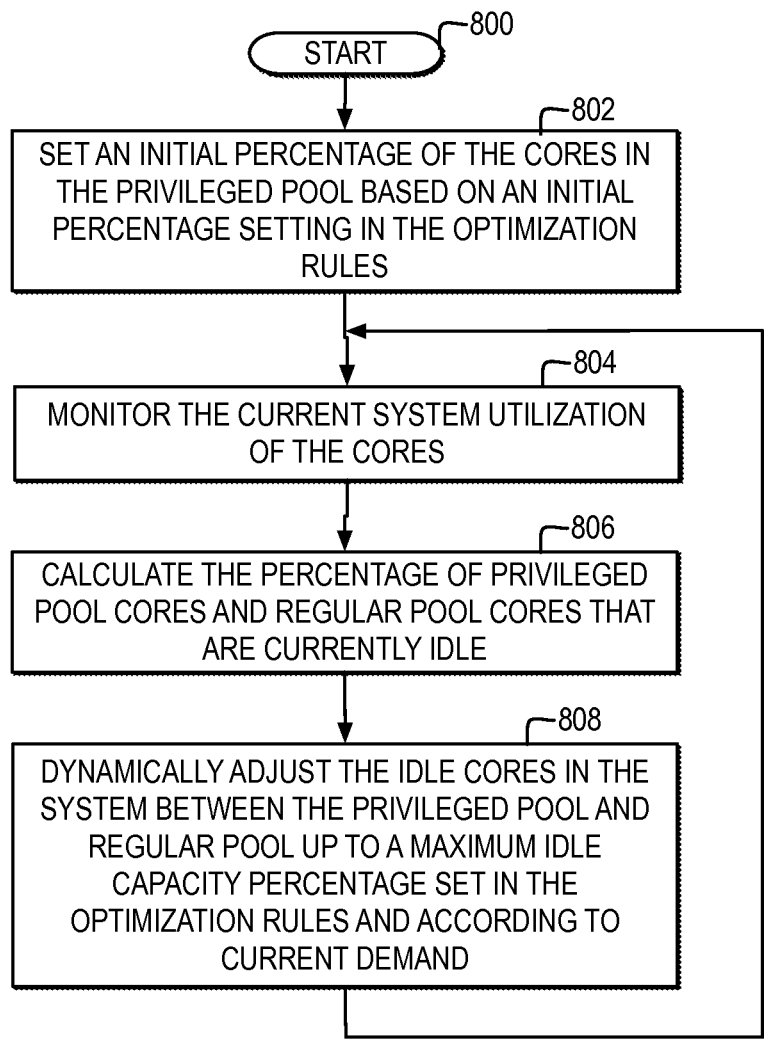
FIG. 8 illustrates a high level logic flowchart of a process and computer program product for dynamically managing a selection of cores assigned to a privilege pool and a selection of core assigned to a general pool.

FIG. 8 illustrates a high level logic flowchart of a process and computer program product for dynamically managing a selection of cores assigned to a privilege pool, as faster cores, and a selection of cores assigned to a general pool. In one example, a process and program starts at block 800 and thereafter proceeds to block 802. Block 802 illustrates setting an initial percentage of the cores in the privileged pool based an initial percentage setting in the optimization rules. Next, block 804 illustrates monitoring the current system utilization of all the cores. Thereafter, block 806 illustrates calculating the percentage of cores in the privileged pool and regular pool that are currently idle. Next, block 808 illustrates dynamically adjusting the idle cores in the system between the privileged pool and regular pool up to a maximum idle capacity percentage set in the optimization rules and according to current demand, and the process returns to block 804.

Figure 9:
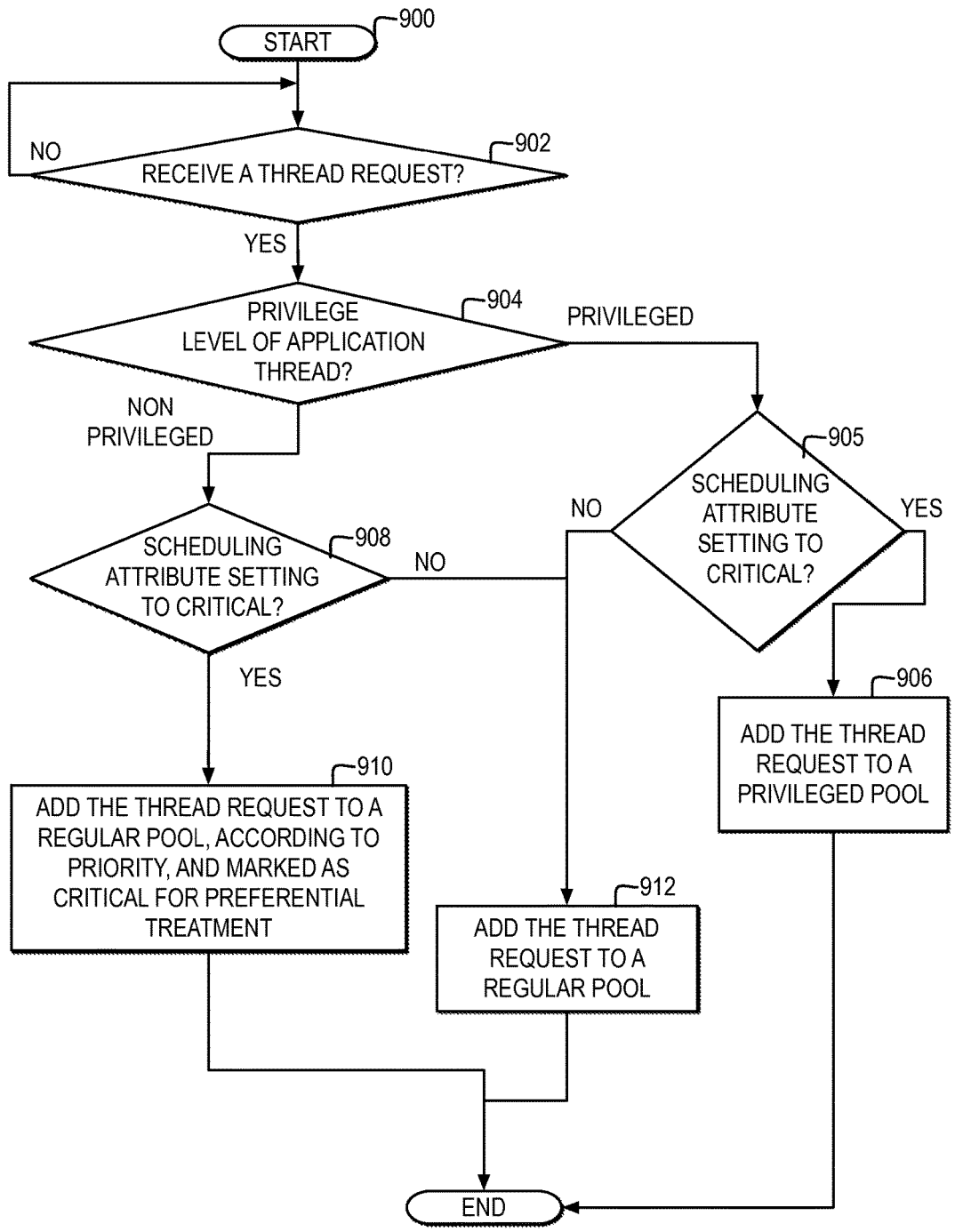
FIG. 9 illustrates a high level logic flowchart of a process and computer program product for dynamically managing scheduling of threads among the privileged pool and the regular pool.

FIG. 9 illustrates a high level logic flowchart of a process and computer program product for dynamically managing scheduling of threads among the privileged pool cores and the regular pool cores. In one example, a process and program starts at block 900 and thereafter proceeds to block 902. Block 902 illustrates a determination whether a thread request is received by a thread request API. At block 902, if a thread request is received, then the process passes to block 904. Block 904 illustrates a determination of the privilege level of the application thread. At block 904, if the privilege level of the application thread request is set to a privileged application, then the process passes to block 905. Block 905 illustrates a determination whether a scheduling attribute is set to critical. At block 905, if the scheduling attribute is set to critical, then the process passes to block 906. Block 906 illustrates adding the thread request to a core queue in the privileged pool and the process ends. Returning to block 905, if the scheduling attribute is not set to critical, then the process passes to block 912. Block 912 illustrates adding the thread request to a regular pool, and the process ends.

Returning to block 904, if the privilege level of the application thread is set to a non-privileged application, the process passes to block 908. Block 908 illustrates a determination whether the thread request is received from the non-privileged application with a scheduling attribute set to critical. At block 908, if the thread request is not received from the non-privileged application with a scheduling attribute set to critical, then the process passes to block 912. Returning to block 908, if the thread request is received from the non-privileged application with a scheduling attribute set to critical, then the process passes to block 910. Block 910 illustrates adding the thread request to a queue in the regular pool, and marked as critical for preferential treatment, and the process ends.

Figure 10:
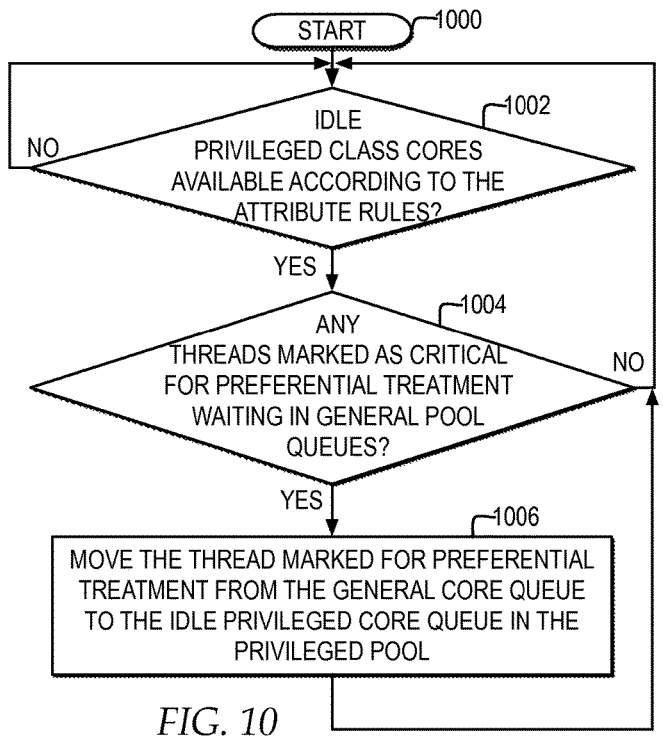
FIG. 10 illustrates a high level logic flowchart of a process and computer program product for dynamically adjusting non-privileged threads marked as critical for preferential treatment from one or more queues in a regular pool to one or more queues in a privileged pool.

FIG. 10 illustrates a high level logic flowchart of a process and computer program product for dynamically adjusting non-privileged threads marked as critical from the regular pool to the privileged pool. In one example, the process and program starts at block 1000 and thereafter proceeds to block 1002. Block 1002 illustrates a determination whether any idle cores within the privileged pool are available according, to attribute rules. At block 1002, if any cores within the privileged pool are available, according to attribute rules, the process passes to block 1004. Block 1004 illustrates a determination whether any threads marked as critical for preferential treatment threads are waiting in the queues in the general pool. At block 1004, if no there are not any threads marked as critical for preferential treatment waiting in the queues in the general pool, then the process returns to block 1002. At block 1004, if there are any threads marked as critical for preferential treatment waiting in the queues for the general pool, then the process returns to block 1006. Block 1006 illustrates moving the thread marked as critical for preferential treatment from the queue in the general pool to an idle queue in the privileged pool, and the process returns to block 1002.

Figure 11:
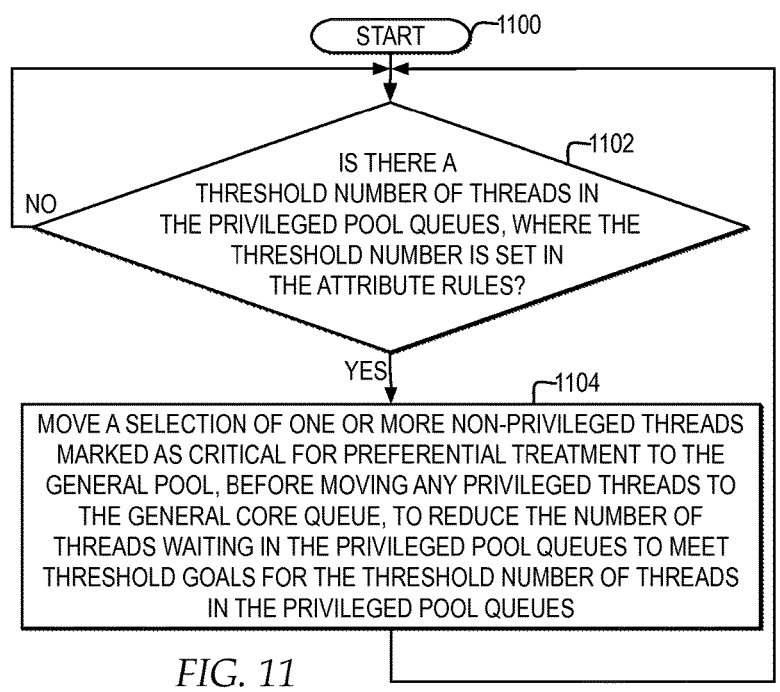
FIG. 11 illustrates a high level logic flowchart of a process and computer program product for dynamically adjusting non-privileged threads marked as critical for preferential treatment from privileged pool to the regular pool first, before moving any privileged threads, in response to a threshold number of thread waiting in the privileged pool.

FIG. 11 illustrates a high level logic flowchart of a process and computer program product for dynamically adjusting non-privileged threads marked as critical for preferential treatment from privileged pool to the regular pool first, before moving any privileged threads, in response to a threshold number of thread waiting in the privileged pool. In one example, the process and program start at block 1100 and thereafter proceed to block 1102. Block 1102 illustrates a determination whether there is a threshold number of threads in the privileged pool queues, where the threshold number is set in the attribute rules. At block 1102, if there is a threshold number of threads in the privileged pool queues, then the process passes to block 1104. Block 1104 illustrates moving a selection of one or more non-privileged thread marked as critical for preferential treatment to the general pool first, before moving any privileged threads to the general core queue, to reduce the number of waiting threads in the privileged pool queues to meet threshold goals for the threshold number of threads in the privilege pool queues, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for scheduling threads, comprising:
   a processor, coupled with a memory, and configured to perform the actions of:
   selectively setting a first selection of one or more cores from among a plurality of cores as at least one privileged core in a privileged pool and a second selection of one or more cores from among the plurality of cores as at least one regular core in a regular pool, each at least one privileged core in the privileged pool providing a higher throughput than each at least one regular core in the regular pool;
   responsive to detecting, by an operating system interface, a non-privileged thread request with a scheduling attribute set to a critical setting to request access to the privileged pool:
      marking the non-privileged thread request for preferential treatment and placing the non-privileged thread request with the marking for preferential treatment in a regular core queue associated with one or more of the at least one regular core;
      determining whether a resource availability of one or more of the at least one privileged core in the privileged pool meets a threshold level of availability;
      responsive to the threshold level of availability being met for the one or more of the at least one privileged core in the privileged pool, moving the non-privileged thread request from the regular core queue to a privileged core queue associated with the one or more of the at least one privileged core with the marking for preferential treatment assigned; and
      dispatching the non-privileged thread request from the privileged core queue to the privileged pool for execution on one of the at least one privileged core; and
   responsive to detecting, by the operating system interface, a privileged thread request with the scheduling attribute set to the critical setting, automatically scheduling the privileged thread request into the privileged core queue.

2. The system according to claim 1, wherein the processor is further configured to perform the actions of:
   determining whether a number of thread requests waiting in the privileged core queue reaches a threshold limit; and
   responsive to determining the number of thread requests waiting in the privileged core queue has reached the threshold limit, first moving the non-privileged thread request with the marking for preferential treatment to the regular core queue before moving any privileged thread request from the privileged core queue to the regular core queue, to reduce the number of thread requests waiting in the privileged core queue.

3. The system according to claim 1, wherein the processor is further configured to perform the actions of:
responsive to receiving a second non-privileged thread request with the scheduling attribute set to a general setting, adding the second non-privileged thread request to the regular core queue only.

4. The system according to claim 1, wherein the processor is further configured to perform the actions of:
responsive to receiving a second privileged thread request with the scheduling attribute set to a general setting, automatically scheduling the second privileged thread request in the regular core queue.

5. The system according to claim 1, wherein the processor is further configured to perform the actions of:
selectively setting the first selection of the one or more cores from among the plurality of cores as the at least one privileged core in the privileged pool, the at least one privileged core each providing a throughput reaching at least a throughput threshold;
selectively setting the second selection of the one or more cores from among the plurality of cores as the at least one regular class core in the regular pool, the at least one regular class core not required to provide a throughput reaching the throughput threshold;
monitoring a current system utilization of each of the plurality of cores; and
dynamically adjusting the first selection of the plurality of cores within the privileged pool and the second selection of the plurality of cores within the regular pool based on the current system utilization of each of the plurality of cores and one or more optimization rules for optimizing use of the plurality of cores.

6. The system according to claim 5, wherein the processor is further configured to perform the actions of:
calculating a percentage of the at least one privileged core and the at least one regular core that are currently idle; and
dynamically adjusting a selection of currently idle cores between the privileged pool and the regular pool up to a maximum idle capacity percentage.

7. The system according to claim 1, wherein the processor is further configured to perform the actions of:
monitoring by the operating system interface, for a call by the non-privileged thread request to another application programming interface of a type of call specified in an attribute rule applied by the operating system interface from among a plurality of application programming interfaces; and
responsive to the operating system interface of the operating system detecting the call by the non-privileged thread request to the another particular application programming interface of a type of call specified in the attribute rule applied by the operating system interface, automatically setting the scheduling attribute of the non-privileged thread request to the critical setting.

8. A computer program product for scheduling threads, the computer program product comprising a computer readable storage medium having program instructions embodied therewith, the program instructions executable by a processor to cause the processor to:
selectively set a first selection of one or more cores from among a plurality of cores as at least one privileged core in a privileged pool and a second selection of one or more cores from among the plurality of cores as at least one regular core in a regular pool, each at least one privileged core in the privileged pool providing a higher throughput than each at least one regular core in the regular pool;
responsive to detecting, by an operating system interface, a non-privileged thread request with a scheduling attribute set to a critical setting to request access to the privileged pool:
mark the non-privileged thread request for preferential treatment and placing the non-privileged thread request with the marking for preferential treatment in a regular core queue associated with one or more of the at least one regular core;
determine whether a resource availability of one or more of the at least one privileged core in the privileged pool meets a threshold level of availability;
responsive to the threshold level of availability being met for the one or more of the at least one privileged core in the privileged pool, move the non-privileged thread request from the regular core queue to a privileged core queue associated with the one or more of the at least one privileged core with the marking for preferential treatment assigned; and
dispatch the non-privileged thread request from the privileged core queue to the privileged pool for execution on one of the at least one privileged core; and
responsive to detecting, by the operating system interface, a privileged thread request with the scheduling attribute set to the critical setting, automatically schedule the privileged thread request into the privileged core queue.

9. The computer program product according to claim 8, further comprising the program instructions executable by a processor to cause the processor to:
determine whether a number of thread requests waiting in the privileged core queue reaches a threshold limit; and
responsive to determining the number of thread requests waiting in the privileged core queue has reached the threshold limit, first move the non-privileged thread request with the marking for preferential treatment to the regular core queue before moving any privileged thread request from the privileged core queue to the regular core queue, to reduce the number of thread requests waiting in the privileged core queue.

10. The computer program product according to claim 8, further comprising the program instructions executable by a processor to cause the processor to:
responsive to receiving a second non-privileged thread request with the scheduling attribute set to a general setting, add the second non-privileged thread request to the regular core queue only.

11. The system according to claim 1, wherein the processor is further configured to perform the actions of:
responsive to detecting, by the operating system interface, the non-privileged thread request with the scheduling attribute set to the critical setting to request access to the at least one privileged core of the plurality of cores, automatically scheduling, using the one or more processors, the non-privileged thread request into a regular core queue if the resource availability of the at least one privileged core does not meet the threshold level of availability, the regular core queue dispatching to the at least one regular core only from among the plurality of cores, the privileged core queue dispatching to the at least one privileged core only from among the plurality of cores.

12. The system according to claim 1, wherein the processor is further configured to perform the actions of:
selectively scheduling, by the operating system interface, using the one or more processors, each thread request of a plurality of thread requests received from a plurality of applications to a separate queue from among a plurality of queues managed by a thread scheduler of an operating system, each queue of the plurality of queues specified for dispatching scheduling thread requests to a separate core only from among the plurality of queues, each of the plurality of thread requests comprising the scheduling attribute set to one of a critical setting or a regular setting, each of the plurality of thread requests comprising a privilege setting based on a privilege level of the requesting application from among one or more privileged applications and one or more non-privileged applications, the one or more privileged applications sending one or more privileged thread requests, the one or more non-privileged applications sending one or more non-privileged thread requests.

13. The computer program product according to claim 8, further comprising the program instructions executable by a processor to cause the processor to:
responsive to detecting, by the operating system interface, the non-privileged thread request with the scheduling attribute set to the critical setting to request access to the at least one privileged core of the plurality of cores, automatically schedule, using the one or more processors, the non-privileged thread request into a regular core queue if the resource availability of the at least one privileged core does not meet the threshold level of availability, the regular core queue dispatching to the at least one regular core only from among the plurality of cores, the privileged core queue dispatching to the at least one privileged core only from among the plurality of cores.

14. The computer program product according to claim 8, further comprising the program instructions executable by a processor to cause the processor to:
selectively schedule, by the operating system interface, using the one or more processors, each thread request of a plurality of thread requests received from a plurality of applications to a separate queue from among a plurality of queues managed by a thread scheduler of an operating system, each queue of the plurality of queues specified for dispatching scheduling thread requests to a separate core only from among the plurality of queues, each of the plurality of thread requests comprising the scheduling attribute set to one of a critical setting or a regular setting, each of the plurality of thread requests comprising a privilege setting based on a privilege level of the requesting application from among one or more privileged applications and one or more non-privileged applications, the one or more privileged applications sending one or more privileged thread requests, the one or more non-privileged applications sending one or more non-privileged thread requests.

* * * * *